(12) United States Patent
Budinger et al.

(10) Patent No.: US 8,393,572 B2
(45) Date of Patent: Mar. 12, 2013

(54) FLOOR ELEMENT WITH ILLUMINATION

(75) Inventors: Tilo Budinger, Hamburg (DE); Carsten Vogel, Hamburg (DE)

(73) Assignee: Airbus Operations GmbH (DE)

( * ) Notice: Subject to any disclaimer, the term of this patent is extended or adjusted under 35 U.S.C. 154(b) by 414 days.

(21) Appl. No.: 12/699,222

(22) Filed: Feb. 3, 2010

(65) Prior Publication Data

US 2010/0193633 A1   Aug. 5, 2010

Related U.S. Application Data

(60) Provisional application No. 61/150,073, filed on Feb. 5, 2009.

(30) Foreign Application Priority Data

Feb. 5, 2009   (DE) .................. 10 2009 007 491

(51) Int. Cl.
   *B64D 11/00*   (2006.01)
(52) U.S. Cl. ..................................... 244/118.5; 362/471
(58) Field of Classification Search ............... 244/118.5, 244/129.4, 129.5, 118.3, 137.2; 362/471
   See application file for complete search history.

(56) References Cited

U.S. PATENT DOCUMENTS

| | | | | |
|---|---|---|---|---|
| 4,794,373 A * | 12/1988 | Harrison | .................. | 340/286.01 |
| 5,243,786 A | 9/1993 | Lubensky et al. | | |
| 5,771,617 A * | 6/1998 | Baker | ............................ | 40/544 |
| 5,775,016 A * | 7/1998 | Chien | ............................ | 40/544 |
| 5,961,072 A | 10/1999 | Bodle | | |
| 6,785,992 B2 * | 9/2004 | Chiarucci | ....................... | 40/596 |
| 7,125,136 B1 * | 10/2006 | Dedic et al. | ................... | 362/152 |
| 7,178,954 B2 * | 2/2007 | Blechschmidt | ............... | 362/471 |
| 7,339,488 B2 | 3/2008 | Pennington et al. | | |
| 7,441,726 B2 * | 10/2008 | Melberg et al. | ............ | 244/129.5 |
| 7,573,396 B2 * | 8/2009 | Stokes | ........................ | 340/693.2 |
| 7,703,956 B2 * | 4/2010 | Wentland et al. | ............. | 362/470 |
| 7,766,521 B2 * | 8/2010 | Wentland et al. | ............. | 362/471 |
| 7,905,638 B2 * | 3/2011 | Kohlmeier-Beckmann et al. | ............................ | 362/470 |
| 2002/0015309 A1 * | 2/2002 | Stokes et al. | .................. | 362/471 |
| 2003/0189823 A1 * | 10/2003 | George et al. | ................... | 362/84 |
| 2005/0104740 A1 * | 5/2005 | Stokes et al. | ............. | 340/815.45 |
| 2006/0145007 A1 * | 7/2006 | Melberg et al. | ............ | 244/118.5 |
| 2008/0253139 A1 | 10/2008 | Stokes | | |
| 2008/0253140 A1 * | 10/2008 | Fleischmann et al. | ........ | 362/487 |
| 2008/0263923 A1 * | 10/2008 | Kim | ............................... | 40/550 |
| 2009/0180292 A1 * | 7/2009 | Yang | ............................ | 362/488 |
| 2010/0188023 A1 * | 7/2010 | Anderson et al. | ............. | 315/312 |
| 2010/0327766 A1 * | 12/2010 | Recker et al. | .................. | 315/291 |

FOREIGN PATENT DOCUMENTS

| | | |
|---|---|---|
| DE | 9111902 U1 | 1/1992 |
| DE | 69603186 T2 | 2/2000 |
| DE | 202005000778 U1 | 4/2005 |
| DE | 202008011565 U1 | 11/2008 |
| EP | 0534072 A1 | 3/1993 |
| EP | 1623878 A1 | 2/2006 |
| EP | 1997732 A2 | 12/2008 |
| WO | 2005009795 A2 | 2/2005 |

* cited by examiner

*Primary Examiner* — Christopher P Ellis

(74) *Attorney, Agent, or Firm* — Lerner, David, Littenberg, Krumholz & Mentlik, LLP

(57) ABSTRACT

The invention pertains to a floor element for a door area of an aircraft that comprises a floor segment and an illuminating device. The illuminating device is integrated into the floor segment. In addition, the illuminating device can be connected to central device of the aircraft such that the coordination and the supervision of evacuation measures can be simplified.

11 Claims, 3 Drawing Sheets

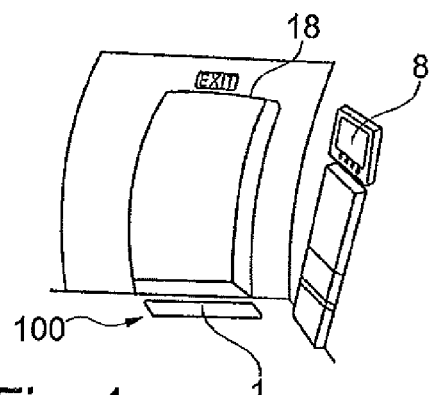
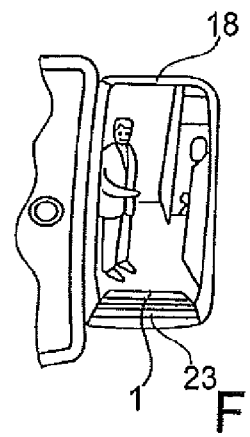
Fig. 1  Fig. 2
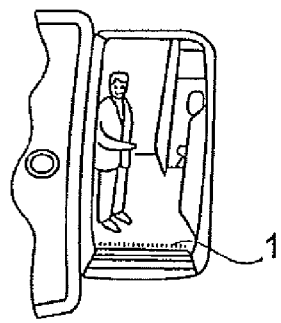
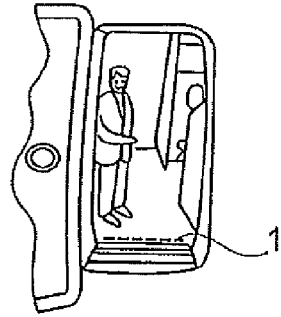
Fig. 3  Fig. 4
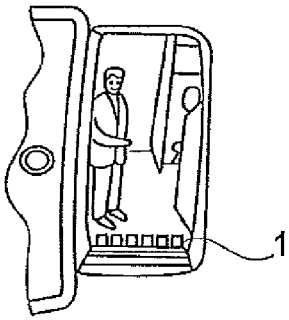
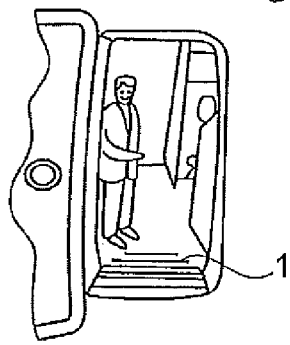
Fig. 5  Fig. 6
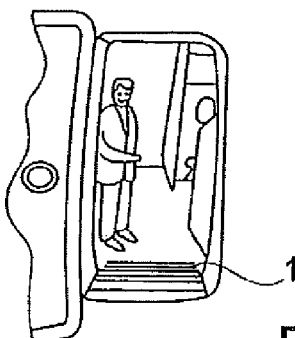
Fig. 7

FLOOR ELEMENT WITH ILLUMINATION

CROSS-REFERENCE TO RELATED APPLICATIONS

This application claims the benefit of the filing date of U.S. Provisional patent application No. 61/150,073 filed Feb. 5, 2009, the disclosure of which application is hereby incorporated herein by reference.

BACKGROUND OF THE INVENTION

The invention pertains to floor elements for aircraft. The invention particularly pertains to a floor element for a door area of an aircraft, as well as to an aircraft with such a floor element.

Kick plates are arranged in the door areas of modern passenger aircraft, wherein said kick plates are provided, among other things, for keeping the door sill area of an aircraft door free of condensation and rain water, as well as for transmitting shearing forces originating from the floor construction.

Kick plates of this type are described, for example, in DE 91 11 902 U1 and EP 0 534 072 A1.

Such kick plates as well as the adjoining floor elements (and therefore the door itself) are frequently difficult to locate in emergency situations, particularly when visibility is limited.

Emergency exit signs may be arranged above the door openings in order to improve the ability to locate doors in emergency situations.

BRIEF SUMMARY OF THE INVENTION

A floor element for a door area of an aircraft and an aircraft according to the characteristics of the independent claims are disclosed. Additional features of the invention are disclosed in the dependent claims.

The described exemplary embodiments likewise pertain to the floor element and to the aircraft. In other words, the characteristics cited below with respect to the floor element can also be implemented in the aircraft and vise versa.

According to one exemplary embodiment of the invention, a floor element for a door area of an aircraft and even a whole door area is disclosed, wherein said floor element comprises a floor segment and an illuminating device. The floor segment may serve for mounting the floor element in the door area of the aircraft. The illuminating device comprises at least one light source and is integrated into the floor segment. The illuminating device furthermore serves for producing a visual boundary between an outside area of the aircraft and an inside area of the aircraft.

Thus, the detection of door areas in aircraft may be improved.

This may make it possible to additionally improve the safety of the passengers and the flight crew. For example, if an emergency situation arises in darkness, persons on board the aircraft can locate the floor element due to its illumination and therefore know where the door sill is located. The floor element and therefore the door sill consequently can also be located when thick smoke develops and in darkness, namely even if the passengers are, for example, in a stooped or cowering position.

The floor element may also enable rescue workers who approach the door area from outside the aircraft to easily locate the floor element and therefore the door sill, namely even when visibility is poor and/or in darkness.

Rescue measures may be significantly simplified in this fashion.

According to another exemplary embodiment of the invention, the light source of the illuminating device is realized in the form of a panel light.

Large parts of the floor segment may be illuminated in this fashion. If a flat panel light is used, the installation depth may be realized correspondingly shallow such that only little structural space is occupied.

According to another exemplary embodiment of the invention, the illuminating device comprises a light source in the form of an organic light-emitting diode (OLED).

Light-emitting diodes also may be provided alternatively or additionally thereto.

According to another exemplary embodiment of the invention, the illuminating device comprises a cover of a hard-wearing and at least partially transparent material.

According to another exemplary embodiment of the invention, the illuminating device comprises a light source in the form of a light-emitting diode that is arranged in a lateral region of the illuminating device, wherein the illuminating device furthermore comprises a diffusor that is designed for distributing the light generated by the light-emitting diode in a largely uniform fashion.

According to another exemplary embodiment of the invention, the floor element furthermore comprises a housing that encloses the illuminating device. In this case, the housing may altogether serve as a cooling element for cooling the light source. However, the housing may also comprise a separate cooling element.

This may ensure that excessive thermal energy of the light source is dissipated.

According to another exemplary embodiment of the invention, the floor element is realized in the form of a door sill or kick plate for the aircraft door.

In addition to the illuminating device, drainage channels, drainage openings and, e.g., anti-slip strips may also be provided in the kick plate.

According to another exemplary embodiment of the invention, the floor element comprises an interface for connecting the illuminating device to a control unit of the aircraft.

The illuminating device may be controlled by means of the control unit. In this case, the control unit is connected, for example, to an operating panel (Flight Attendant Panel, FAP) that is operated by the flight personnel.

According to another exemplary embodiment of the invention, the illuminating device comprises at least one first light source and one second light source, wherein the second light source is separated from the first light source. The first light source serves for producing a visual boundary between the outside area of the aircraft and the inside area of the aircraft, and the second light source serves as emergency illumination for marking the emergency exit.

The first light source naturally may also be used for marking the emergency exit.

According to another exemplary embodiment of the invention, the second light source comprises a separate second interface for being connected to an emergency illumination power supply.

This means that two power supplies are provided. One power supply serves for supplying the first light source and the other power supply serves for supplying the second light source.

This redundancy means that the safety may be improved.

According to another exemplary embodiment of the invention, an aircraft is disclosed that comprises a door area and a floor element for the door area. The floor element comprises an above-described floor segment, as well as an above-described illuminating device with a light source.

According to another exemplary embodiment of the invention, the aircraft is a passenger aircraft. However, the aircraft may also be a helicopter or, for example, an airship.

Exemplary embodiments of the invention are described below with reference to the figures.

BRIEF DESCRIPTION OF THE DRAWINGS

FIG. 1 shows a door area of an aircraft with a floor element according to one exemplary embodiment of the invention.

FIG. 2 shows an outside view of the door area of FIG. 1 according to one exemplary embodiment of the invention.

FIG. 3 shows a door area according to another exemplary embodiment of the invention.

FIG. 4 shows a door area according to another exemplary embodiment of the invention.

FIG. 5 shows a door area according to another exemplary embodiment of the invention.

FIG. 6 shows a door area according to another exemplary embodiment of the invention.

FIG. 7 shows a door area according to another exemplary embodiment of the invention.

DETAILED DESCRIPTION

Figure 8:
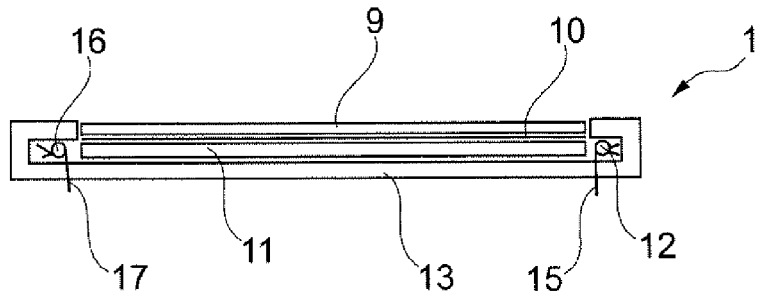
FIG. 8 shows a cross-sectional representation of an illuminating device according to one exemplary embodiment of the invention.

The figures show schematic illustrations that are not true-to-scale.

In the following description of the figures, the same reference symbols are used for identical or similar elements.

FIG. 1 shows a door area of an aircraft with a floor element 100 according to one exemplary embodiment of the invention. The floor element 100 features a floor segment 14 (see FIG. 10) and an illuminating device 1 with a light source. The floor element 100 is integrated into the floor of the passenger cabin in the interior of the aircraft and therefore arranged in the immediate vicinity of the entry opening 18.

In addition, a control device 8 in the form of a Flight Attendant Panel (FAP) 8 is provided and arranged adjacent to the door on a wall element.

An Exit sign is situated above the door frame 18.

FIG. 2 shows the entry area of FIG. 1 viewed from a vantage point outside the aircraft. A door sill 23 is situated in the door frame 18. The floor element 1 is integrated into the cabin floor behind this door sill. The floor element 1 is realized in the form of a flat panel light with a corresponding transparent or semi-transparent protective cover. The protective cover ends flush with the floor segment of the floor element and therefore is arranged on the same level as the floor of the passenger cabin.

The panel light used comprises a very flat panel light with very small structural height that produces a visual boundary relative to the outside area in the entry region of passenger aircraft. Normally, a visual boundary relative to the aircraft buildings or the gangway is provided.

Analyses have shown that people, particularly aircraft passengers, convey prior experiences that were made in the short to medium term, as well as the mood resulting thereof, to new situations and therefore do not confront the new situations without bias. If one analyzes the situation of an aircraft passenger from the beginning of the trip at home until the time at which the passenger boards the aircraft in light of the aforementioned circumstances, it can be determined that there is a high potential for a rather negative mood.

Furthermore, this "previous history" of the passenger cannot be influenced, at least not on the part of the aircraft manufacturer. The simple and clear visual separation between the departure terminal, check-in, security check, gangway, bus transport and ventral stair on one hand and the interior of the aircraft on the other hand creates a break that is at least perceived subconsciously in any case when stepping over the inventive floor element.

The floor element with the flat panel light is integrated in the area of entry doors. The panel light is realized in such a way that the luminosity, the brightness and the color can be adjusted. In addition, a symbol, lettering or pattern can be applied by means of a passe-partout or a corresponding stencil (see FIG. 9). The control is realized with the cabin management system (CMS), namely by means of a light control unit. It is therefore possible to seamlessly integrate the illumination of the illuminating unit into internal light scenarios of the aircraft.

The floor element with the illuminating device creates a clear separation between the apron and the cabin. It furthermore supports the light design of the cabin in the entry area and therefore enhances the area of the cabin that has a rather technical appearance.

This may make it possible to positively influence the subjective perception of the individual passengers and, for example, to facilitate the so-called "Special Experience of Flying." The illumination can be used, in particular, for improving the sense of security of the passengers and for thusly ensuring calm and planned actions in emergency situations.

FIG. 3 shows another exemplary embodiment of a floor element with an illuminating device 1 that is realized in the form of a dotted arrangement in this case. It is possible to provide several point sources of light in a linear arrangement. Alternatively, a screen or stencil with a corresponding pattern of holes could be provided.

FIG. 4 shows the illuminating device with a screen for producing a broken light pattern. FIG. 5 shows the illuminating device with a screen that features recesses in the form of stripes. FIG. 6 shows the illuminating device with a screen that features two parallel linear recesses.

FIG. 7 shows the illuminating device with a screen that features three parallel linear recesses.

FIG. 8 shows a cross-sectional representation of an illuminating device 1 according to one exemplary embodiment of the invention.

The illuminating device 1 features an upper cover 9 and a stencil or screen 10 that is arranged underneath the cover 9. A panel light and/or a diffusor is/are arranged thereunder, namely in the plane 11. White or colored LEDs 12, 16 or RGB-LED color mixing systems are arranged in the plane 11 adjacent to the diffusor, namely on the left and the right side thereof. The enclosing housing 13 is situated thereunder.

First and second interfaces 15, 17 are arranged on the housing. The first interface 15 serves for the normal power supply of the light sources during the normal operation and the second interface 17 serves for an emergency power supply of separate emergency light sources (for example, light-emitting diode 16).

The floor element with the illuminating device 1 is installed in the door area of the aircraft. For example, the light source is realized flatly and may feature lines or line combinations, interrupted lines, dotted lines, stripe patterns or any other pattern such as, e.g., abstract logos or symbols or letterings. The illuminating device is structured as follows: the upper cover 9 consists of a transparent and hard-wearing material such as, e.g., glass or plastic. The embodiment with patterns either features a hard-wearing material that is only transparent in the areas of the image or a stencil 10 is situated underneath the completely transparent and hard-wearing cover 9. The stencil 10 features the motif in the form of a recess or printing. Either the panel light, e.g., an OLED or a panel-type florescent device, and/or the diffusor is/are situated in the next plane 11, wherein the light of white or colored LEDs or of RGB-LED color mixing systems 12 is laterally incident into said diffusor. The enclosing housing that also acts as a cooling element is situated thereunder.

The light threshold is controlled by means of the light control of the Cabin Management System, e.g., the Cabin Intercommunication and Data System (CIDS) on the FAP 8. This makes it possible to infinitely dim the brightness of the light threshold (floor element). If an RGB-LED color mixing system is used, the light threshold can also participate in the colored light scenarios of the cabin illumination.

In addition, the light threshold can be used as part of the emergency illumination system for marking the emergency exit. For this purpose, separate light sources in the form of white and/or red LEDs or OLEDs are provided and connected to the emergency illumination power supply strictly separate of the remaining system.

These redundancies may make it possible to additionally improve the safety in air traffic.

FIGS. 9A to 9J show exemplary embodiments of covers 9 that are either printed or feature, for example, a corresponding screen that is arranged underneath the cover. The housing 13 of the illuminating device is arranged around the covers 9 and fitted into a corresponding floor segment of the inventive floor element.

Figure 9A:
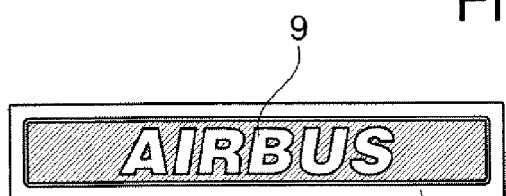
FIGS. 9A to 9J show possible covers for an illuminating device of a floor element according to exemplary embodiments of the invention.
Figure 9F:
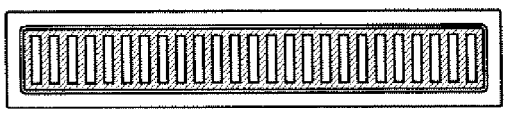
Figure 9B:
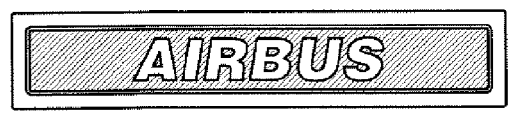
Figure 9G:
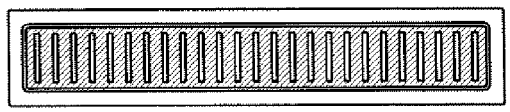
Figure 9C:
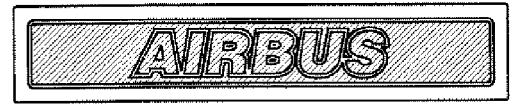

FIG. 9A shows a cover with the lettering "Airbus." A similar cover is shown in FIG. 9B. FIG. 9C shows a cover with the lettering "Airbus," wherein only the edges of the letters are illuminated in this figure rather than the entire surface of the letters as shown in FIGS. 9A and 9B.

Figure 9H:
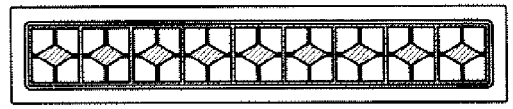
Figure 9D:

FIG. 9D shows a stripe pattern consisting of three parallel lines. FIG. 9E shows four parallel lines. FIG. 9F shows a plurality of transversely arranged parallel stripes. FIG. 9G shows a plurality of parallel transverse lines.

Figure 9I:
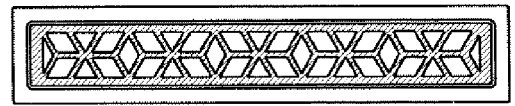
Figure 9E:
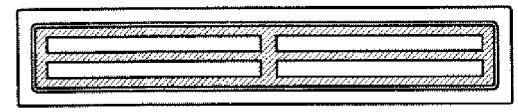
Figure 9J:
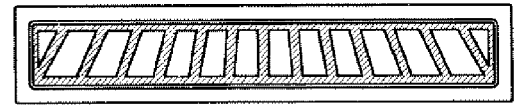

FIG. 9H shows one possible geometric pattern with several diamonds and FIG. 9I shows another geometric pattern with several diamonds and parallelograms. FIG. 9J shows several converging lines that impart a perspective impression.

Figure 10:
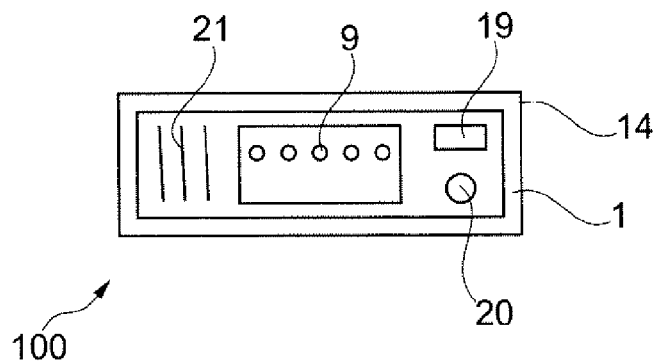
FIG. 10 shows a floor element according to one exemplary embodiment of the invention.

FIG. 10 shows a floor element 100 with an illuminating device 1 that features a drainage channel 19, a drainage opening 20 and three anti-slip strips 21. The illuminating device 1 is integrated into the floor segment 14 such that the upper side of the cover 9 is situated on the same level as the upper side of the floor segment 14.

Figure 11:
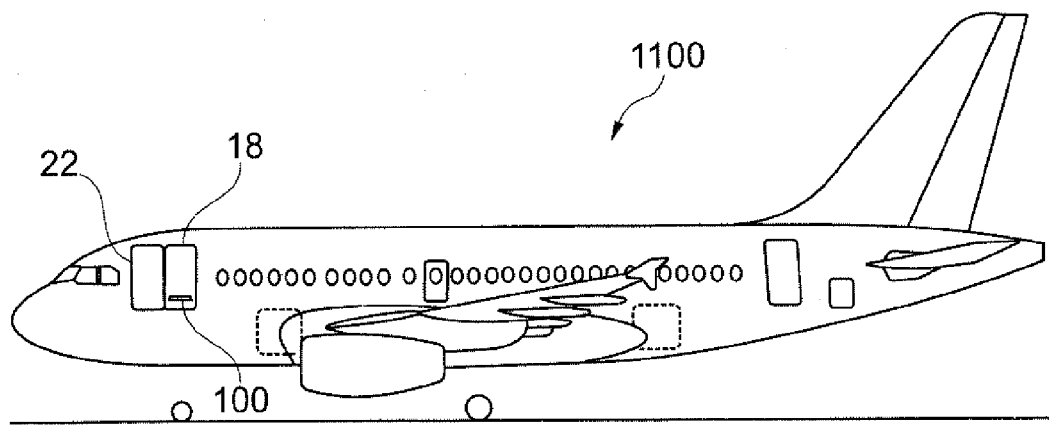
FIG. 11 shows an aircraft according to one exemplary embodiment of the invention.

FIG. 11 shows an aircraft 1100 with a door frame 18 and a door 22. The inventive floor element 100 is installed behind the door frame 18.

As a supplement, it should be noted that "comprising" and "featuring" do not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

The invention claimed is:

1. A door area of an aircraft passenger cabin, comprising a floor element the floor element comprising:
    a floor segment mounted in the door area; and
    an illuminating device with a light source;
    wherein the illuminating device is integrated into the floor segment and is configured to produce a visual boundary between the outside area of the aircraft and an inside area of the aircraft;
    wherein the illuminating device comprises a cover of a hard-wearing and at least partially transparent material which ends flush with the floor segment of the floor element and which is arranged on the same level as a floor of the passenger cabin.

2. The door area of claim 1,
    wherein the light source of the illuminating device comprises a panel light.

3. The door area of claim 1,
    wherein the illuminating device comprises an organic light-emitting diode (OLED).

4. The door area of claim 1,
    wherein the illuminating device comprises a light-emitting diode arranged in a lateral region of the illuminating device; and
    wherein the illuminating device further comprises a diffusor configured for distributing the light generated by the light-emitting diode in a largely uniform fashion.

5. The door area of claim 1, further comprising:
    a housing that encloses the illuminating device;
    wherein the housing comprises a cooling element for cooling the light source.

6. The door area of claim 1,
    wherein the floor element comprises a door sill.

7. The door area of claim 1, further comprising:
    a first interface for connecting the illuminating device to a control unit of the aircraft.

8. The door area of claim 1,
    wherein the illuminating device comprises at least one first light source and one second light source that is separated from the first light source;
    wherein the first light source is configured to produce a visual boundary between an outside area of the aircraft and an inside area of the aircraft; and
    wherein the second light source comprises an emergency illumination for marking an emergency exit.

9. The door area of claim 8,
    wherein the second light source comprises an interface for being connected to an emergency illumination power supply.

10. An aircraft comprising:
    a cabin with a floor;
    a door area; and
    a floor element for the door area, the floor element comprising:
    a floor segment mounted in the door area;
    an illuminating device with a light source;
    wherein the illuminating device is integrated into the floor segment and is configured to produce a visual boundary between an outside area of the aircraft and an inside area of the aircraft;

wherein the illuminating device comprises a cover of a hard-wearing and at least partially transparent material which ends flush with the floor segment of the floor element and which is arranged on the same level as the floor or the cabin.

11. The aircraft of claim 10, wherein the aircraft comprises a passenger aircraft.

* * * * *

UNITED STATES PATENT AND TRADEMARK OFFICE
CERTIFICATE OF CORRECTION

| | | |
|---|---|---|
| PATENT NO. | : 8,393,572 B2 | Page 1 of 1 |
| APPLICATION NO. | : 12/699222 | |
| DATED | : March 12, 2013 | |
| INVENTOR(S) | : Tilo Budinger and Carsten Vogel | |

It is certified that error appears in the above-identified patent and that said Letters Patent is hereby corrected as shown below:

Title page, item 57, Column 2, fifth line of Abstract, "to central device" should read -- to a central control device --.

In the Claims

Column 6, line 10, Claim 1, between "element" and "the" insert -- , --.

Signed and Sealed this
First Day of September, 2015

Michelle K. Lee
*Director of the United States Patent and Trademark Office*